US009566883B2

(12) United States Patent
Gottwald et al.

(10) Patent No.: US 9,566,883 B2
(45) Date of Patent: Feb. 14, 2017

(54) TRAPEZOIDAL COMPONENT, LINEAR GUIDE, AND HEAD RESTRAINT

(76) Inventors: Martin Gottwald, Leverkusen (DE); Thomas Dillinger, Wermelskirchen (DE); Robby Potisch, Burscheid (DE)

( * ) Notice: Subject to any disclaimer, the term of this patent is extended or adjusted under 35 U.S.C. 154(b) by 541 days.

(21) Appl. No.: 13/816,234

(22) PCT Filed: May 18, 2011

(86) PCT No.: PCT/EP2011/002456
§ 371 (c)(1),
(2), (4) Date: Apr. 29, 2013

(87) PCT Pub. No.: WO2012/022386
PCT Pub. Date: Feb. 23, 2012

(65) Prior Publication Data
US 2013/0206930 A1 Aug. 15, 2013

(30) Foreign Application Priority Data

Aug. 17, 2010 (DE) .................. 10 2010 034 635
Aug. 20, 2010 (DE) .................. 10 2010 035 031

(51) Int. Cl.
*B68G 5/00* (2006.01)
*B60N 2/48* (2006.01)
(Continued)

(52) U.S. Cl.
CPC ........... *B60N 2/4811* (2013.01); *B60N 2/4864* (2013.01); *F16C 29/02* (2013.01); *F16C 29/04* (2013.01);
(Continued)

(58) Field of Classification Search
CPC ..... B60N 2/4808; B60N 2/4805; B60N 2/482; B60N 2/4823; B60N 2/4826; B60N 2/4829; B60N 2/48; A47B 2/48; F16C 29/02; F16C 29/04; F16C 29/123; F16C 33/26; F16C 33/46; F16C 33/4635; F16C 2326/08
(Continued)

(56) References Cited

U.S. PATENT DOCUMENTS

| 4,688,852 A | * | 8/1987 | Arai | ..................... B60N 2/4817 |
| | | | | 297/354.12 |
| 6,189,843 B1 | * | 2/2001 | Pfister | .................... A47B 9/083 |
| | | | | 248/157 |

(Continued)

FOREIGN PATENT DOCUMENTS

| CN | 101151474 A | 3/2008 |
| CN | 101629600 A | 1/2010 |

(Continued)

OTHER PUBLICATIONS

International Search Report for application No. PCT/EP2011/002456 mailed Nov. 9, 2011.
(Continued)

*Primary Examiner* — Christopher E Garft
(74) *Attorney, Agent, or Firm* — Fletcher Yoder, P.C.

(57) ABSTRACT

The invention relates to a trapezoidal component comprising a base element and two legs, which are each connected to the base element in a transition region. The invention further relates to a linear guide and to a head restraint having such a linear guide.

5 Claims, 3 Drawing Sheets

(51) Int. Cl.
  *F16C 29/02*   (2006.01)
  *F16C 29/04*   (2006.01)
  *F16C 29/12*   (2006.01)
  *F16C 33/26*   (2006.01)
  *F16C 33/46*   (2006.01)

(52) U.S. Cl.
  CPC ............. *F16C 29/123* (2013.01); *F16C 33/26* (2013.01); *F16C 33/46* (2013.01); *F16C 33/4635* (2013.01); *F16C 2326/08* (2013.01)

(58) Field of Classification Search
  USPC ....... 248/118, 118.3; 297/410; 384/50, 51, 7
  See application file for complete search history.

(56) References Cited

U.S. PATENT DOCUMENTS

| | | | |
|---|---|---|---|
| 6,203,199 B1 | 3/2001 | Pfeuffer | |
| 6,942,417 B2 * | 9/2005 | Schwarzbich | B62D 1/185 403/109.1 |
| 2005/0045575 A1 * | 3/2005 | Wimmer | F16C 29/02 212/350 |

FOREIGN PATENT DOCUMENTS

| | | |
|---|---|---|
| DE | 3608184 A1 | 9/1987 |
| DE | 20014397 U1 | 1/2002 |
| DE | 10300876 A1 | 7/2004 |
| DE | 112006003427 B4 | 10/2008 |
| EP | 0974484 A2 | 1/2000 |
| EP | 1194326 A1 | 4/2002 |
| JP | S62228714 | 10/1987 |
| JP | 11-062956 | 5/1999 |
| JP | 2001-003934 | 9/2001 |
| WO | 0132054 A1 | 5/2001 |

OTHER PUBLICATIONS

International Preliminary Report on Patentability mailed Feb. 28, 2013.
Japanese Office Action dated Oct. 29, 2013.

* cited by examiner

TRAPEZOIDAL COMPONENT, LINEAR GUIDE, AND HEAD RESTRAINT

CROSS REFERENCE TO RELATED APPLICATIONS

This application claims priority from and the benefit of PCT Application No. PCT/EP2011/002456, filed on May 18, 2011; German Patent No. DE 10 2010 034 635.7, filed on Aug. 17, 2010; and German Patent DE 10 2010 035 031.1, filed on Aug. 20, 2010; all entitled "Trapezoidal Component, Linear Guide, and Head Restraint", which are herein incorporated by reference.

BACKGROUND

The present invention relates to a trapezoidal component having a base element and two arms, each of which is connected to the base element in a transition region. The present invention relates furthermore to a linear guide and a head restraint having such a linear guide.

Trapezoidal components are used in the vehicle interior design industry usually in order to alter the depth of steering columns or to adjust head restraints, as can be seen from DE 11 2006 003 427 B4 or EP 1 194 326 B1, for example. The trapezoidal components described here do, however, have a relatively complicated structure.

SUMMARY

The object of the present invention is therefore to provide a trapezoidal component that can be manufactured as efficiently and advantageously as possible.

The object is achieved by a trapezoidal component that has a base element and two arms, each of which is connected to the base element in a transition region, wherein the transition region has a smaller material thickness than the base element and/or the arms.

The embodiments created to form the subject according to the invention of the present invention apply equally to the other subjects of the present invention, and vice versa.

The present invention relates to a trapezoidal component that is used, for example, as a linear guide in the automobile interior design industry. The component has a trapezoidal cross-section with a base element and two arms, wherein, unlike a U-shaped profile, the arms do not project perpendicularly from the base element but are bent inward. A deformation region in which the material thickness is less than in the region of the base or the arms and is plastically deformed is arranged in the transition region between the base element and the arms. As a result, the component according to the invention, in particular the base element and the arms, can be injection-molded as a plane flat component and then given its trapezoidal shape by plastic deformation. This preferably takes place by heating the deformation regions and the material of the component then being plastically formed into the trapezoidal shape. After cooling, the component according to the invention retains its shape. The component according to the invention can, however, also be produced in a different fashion, for example by extrusion or by stamping of a flat semifinished product and then deforming the semifinished product into the trapezoidal shape. The component is preferably a plastic part, in particular an injection-molded plastic part.

According to a preferred or a further subject according to the invention of the present invention, the component has a plurality of rolling bodies that are arranged in rotating and preferably latching fashion on the component. As a result, the rolling bodies can be mounted on the component simply and preferably without the use of tools. The rolling bodies can, for example, be cylinders, cones and/or balls. These rolling bodies are preferably connected to the component by a latching/snap closure, this mounting allowing each rolling body to rotate about at least one spatial axis.

The embodiments created to form the subject according to the invention of the present invention apply equally to the other subjects of the present invention, and vice versa.

Each rolling body preferably has at least one indentation that interacts in latching fashion with a complementary bulge on the component.

According to another preferred subject according to the invention of the present invention, each rolling body has at least one bulge, for example a bearing pin, by means of which the rolling body is provided in latching fashion on the component.

Each rolling body preferably has two indentations and/or bulges that are preferably provided on opposite sides of the rolling body.

According to a further or a preferred subject of the present invention, the component has at least one sliding element.

The embodiments created to form the subject according to the invention of the present invention apply equally to the other subjects of the present invention, and vice versa.

By virtue of this sliding element, the frictional resistance when the component is displaced relative to another component is reduced. The sliding element preferably has a convex design at least in some sections, as a result of which in particular the contact area of the sliding element with another element is reduced.

The sliding element preferably has a spring means. As a result, the component can be tensioned against another component and/or manufacturing tolerances can be compensated for. The spring means advantageously consists of one or more curved leaf springs that preferably bear tangentially against a component, for example a rail. The spring means are particularly advantageously designed integrally with the sliding element, preferably by being injection-molded from plastic.

The sliding element is preferably shear-resistantly fastened to the component or provided so that it can slide between two components. The sliding elements are particularly advantageously fastened positively, in particular in locking fashion, to the component. The sliding element is preferably made from a plastic with a low coefficient of friction, for example polyoxymethylene (POM), polyamide (PA) and/or a mixture thereof.

A rolling body and/or a sliding element are in each case preferably provided on the base element and on the arms.

The component according to the invention is preferably part of a linear guide in which two rails are displaced relative to each other.

Another subject of the present invention is therefore a linear guide that preferably has the trapezoidal component according to the invention.

The embodiments created to form the subject according to the invention of the present invention apply equally to the other subjects of the present invention, and vice versa.

Such linear guides generally consist of two rails that are displaced relative to each other. A roller bearing cage can be provided between the rails.

In the case of the linear guide according to the invention, the displacement between the rails can be provided with sliding friction. The displacement between the rails is preferably provided exclusively with sliding friction.

According to a first preferred embodiment of the linear guide according to the invention, a first rail can be adjusted directly relative to a second rail with sliding friction. According to another preferred embodiment, at least one sliding element spacing the rails apart is arranged between the first rail and the second rail. The sliding element can be shear-resistantly fastened to one of the two rails or provided in sliding fashion between the two rails. The sliding elements are particularly advantageously fastened to the rail or rails positively, in particular in latching fashion. The sliding element is preferably made at least partially from a plastic with a low coefficient of friction, for example polyoxymethylene (POM), polyamide (PA) or a mixture thereof. The rails are preferably made from metal, in particular steel or aluminum. The sliding element particularly advantageously has spring means that tension the sliding element against the rail(s) with pretension, and/or tension the rails against each other. The spring means advantageously consist of curved leaf springs that preferably bear tangentially against the relevant rail. The spring means are particularly advantageously integrally formed with the sliding element, preferably by being injection-molded from plastic, for example. The linear guide advantageously consists of trapezoidal rails that have an antirotation effect as well as acting as a linear guide. The linear guide is particularly advantageously associated with a head restraint, wherein one rail is connected to a first head restraint part and the other rail to a further head restraint part, and it is made possible to linearly adjust the head restraint parts relative to each other. It is in particular preferred to connect one rail to the cushion of the head restraint and the second rail to the base body of the head restraint such that the spacing of the head restraint from the head of the passenger in the seat can be adjusted.

A roller bearing cage can also be provided between the rails of the linear guide.

The trapezoidal component according to the invention is preferably such a rail and/or such a roller bearing cage that is provided between two rails.

A further subject of the present invention is therefore a vehicle interior design part having the linear guide according to the invention.

The embodiments created to form the subject according to the invention of the present invention apply equally to the other subjects of the present invention, and vice versa.

The vehicle interior design part is preferably a head restraint in which a first part, for example the headrest surface, can be adjusted relative to a second part, for example a base body. In this head restraint, the linear adjustment according to the invention is preferably arranged between the headrest surface and the base body of the head restraint in order to adjust the depth (X direction of the vehicle). One of the rails (outer rail or inner rail) is thus preferably fastened to the cushion part and the other rail (inner rail or outer rail) to the base body of the head restraint or to the head restraint holding rods. By virtue of the trapezoidal shape, an antirotation effect is enabled in addition to the length adjustment. It is in particular provided to equip the rail system with a locking system that acts directly between the rails and can be released temporarily in order to make an adjustment. Alternatively, a locking system can, for example, also be provided directly between the cushion part and the base body.

DRAWINGS

The invention is explained below with the aid of FIGS. 1 to 7. These explanations are simply by way of example and do not restrict the general concept of the invention. The explanations apply equally for all the subjects of the present invention.

DETAILED DESCRIPTION

Figure 1:
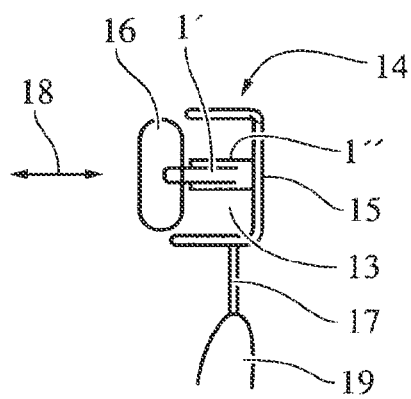
FIG. 1 shows the head restraint according to the invention.

FIG. 1 shows the head restraint 14 according to the invention. The head restraint according to the invention is provided on the backrest 19 of a vehicle seat, for example, by means of holding rods 17 and has a rear shell 15, a base body, and a headrest surface 16 that is provided so that it can be displaced longitudinally relative to the rear shell 15 so that it can be moved in the direction 18 (X direction) toward and away from the head of a passenger in the seat of the vehicle for reasons of comfort and/or safety. For this purpose, the head restraint has a linear guide 13 which, in the present case, consists of two trapezoidal rails 1', 1", wherein the rail 1' is connected to the rear shell 15 and the rail 1" to the headrest surface 16. The headrest surface is guided axially and nonrotationally by the two interconnected trapezoidal rails 1', 1" so that a single linear guide 13 is usually sufficient. However, two or more linear guides 13 can also be provided. Furthermore, it is known to a person skilled in the art that the head restraint 14 can also be displaced as a whole relative to the rods 17. Rolling bodies 6, in particular cylindrical rolling bodies, and/or sliding elements 21, are preferably provided on at least one of the two rails and/or, as required, on a roller bearing cage that is arranged between the rails 1', 1", in order to reduce friction when making a length adjustment. It is, however, also possible for the rails 1', 1" to slide directly on each other.

Figure 2:
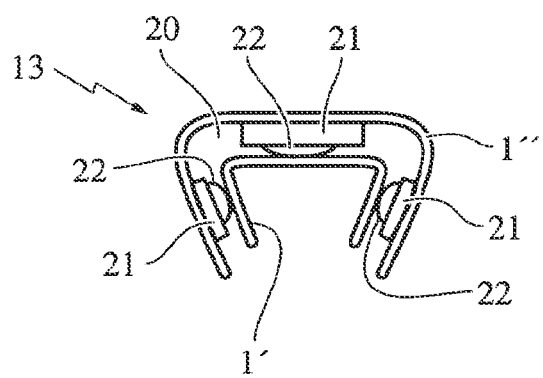
FIG. 2 shows a linear guide with a sliding means.

As shown in FIG. 2, the linear guide 13 here consists of an outer trapezoidal rail 1" and an inner trapezoidal rail 1' that can be displaced lengthwise relative to each other in sliding fashion. Sliding elements 21 that are equipped with spring means 22 that are tensioned against the outer surface of the inner rail 1' are fastened in the gap 20 between the rails 1", 1' on the inner surfaces of the outer rail 1". The arrangement of the sliding elements 21 is provided in such a way that they are arranged between three facing surfaces of the rails 1', 1". The spring means 22 tension the inner rail 1' against the outer rail. As a result, manufacturing tolerances can be compensated for and noise prevented.

Figure 3:
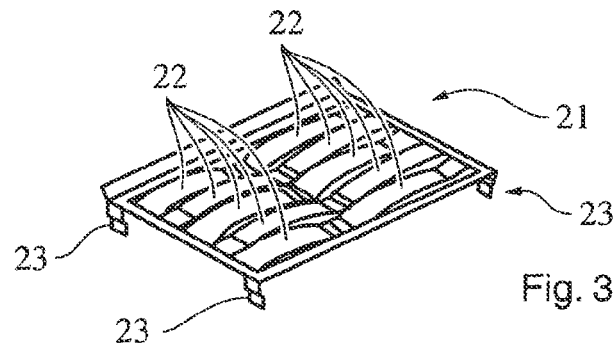
FIG. 3 shows the sliding means.

As can be seen from FIG. 3, the sliding elements 21 preferably take the form of blocks and are equipped with a fastening means, for example latching tongues 23, by means of which they can, for example, be latched positively and/or shear-resistantly into corresponding recesses in the rail 1". On its upper surface facing the inner rail 1', each sliding element 10 preferably has a plurality of preferably integrally formed spring elements 22, leaf springs in this case, that after installation bear tangentially and with tension against the inner rail 1'. Tolerances in the gap 9 are hereby compensated with low friction.

Figure 4:
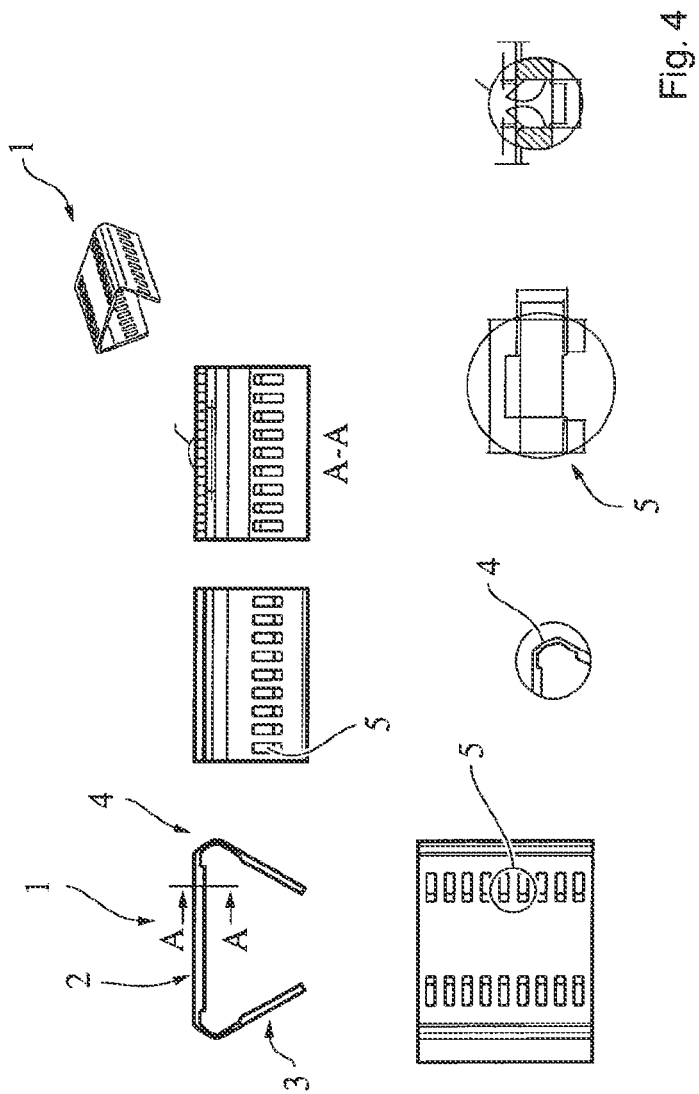
FIG. 4 shows an embodiment of the trapezoidal component.

FIG. 4 shows a further embodiment of the trapezoidal component 1, in this case a roller bearing cage, that has a base element 2 on which an arm 3 is provided to the right and left respectively. This arm 3 is in each case bent inward plastically, vis-à-vis a U-profile, such that the trapezoidal cross-section of the component 1 results. At the transition between the base element and the respective arm, the component according to the invention has a deformation region 4 in which it has a lower material thickness than in the base or arm region. The deformation region is preferably a film hinge. As a result, the component, in particular the base element and the arms, which is preferably made from plastic, can be first injection-molded as a flat component. The component is then bent plastically into its shape shown in FIG. 1. According to the invention, to achieve this the deformation region 4 is heated to the plasticization temperature so that, after cooling, the component retains its trapezoidal shape. By virtue of this method of production, the component according to the invention can be produced with a relatively simple injection molding die. Furthermore, as can be seen in FIG. 4, the component has a plurality of recesses 5 that are arranged in the region of the rolling bodies. These rolling bodies are provided both on the base element 2 and on the two arms 3. The rolling bodies are preferably provided in the inner region of the cross-section of the component 1 but can extend at least partially through or into the recesses 5. The component 1 shown can also be a rail 1', 1" of a linear guide 13 (cf. FIGS. 1 and 2) on which rolling bodies 6, as described above, are provided. In this case, a roller bearing cage may optionally be omitted.

Preferably or according to a further subject of the present invention, the rolling bodies 6 are fastened to the component 1, 1', 1" by a latching/snap mechanism so that this assembly procedure is relatively simple and can be carried out without using any tools.

Figure 5:
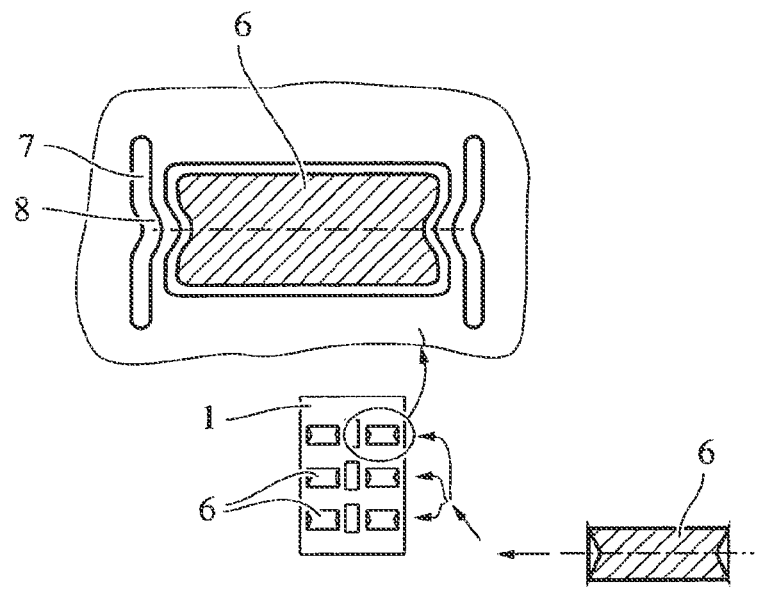
FIGS. 5 to 7 show embodiments of the latching mechanism with which the rolling bodies are provided on the trapezoidal component.

FIG. 5 shows a first embodiment of such a latching/snap mechanism. Two webs 7 that have a bulge 8 are provided per rolling body and are integral with the component 1. This bulge 8 interacts at least partially positively in each case with an indentation in the end face of the rolling body 6 and thus represents an axis of rotation for the rolling body. The rolling body can also take the form of a hollow element, for example a cylindrical hollow element.

Figure 6:
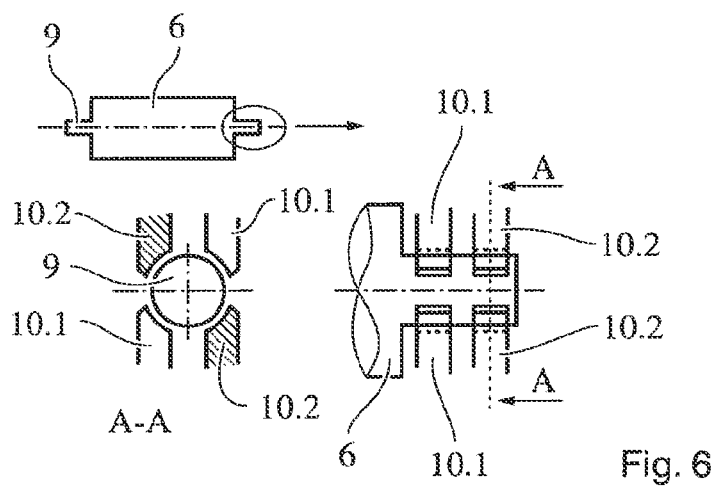

FIG. 6 shows a further option for fastening the rolling bodies 6 to the component 1, 1', 1". In the present case, the rolling body 6, in this case a cylinder, has bulges 9, in this case bearing pins 9, that are in each case provided on the end side of the cylinder. These bearing pins are each mounted on four bearing webs 10.1, 10.2 by the bearing pin 9 latching into the latter. The bearing webs 10.1, 10.2 are provided integrally with the component 1, 1', 1". As can be seen in particular from the cross-section A-A, the bearing webs 10.1 and 10.2 are in this case provided such that they are at least partially offset relative to one another, the bearing webs 10.1 and 10.2 each being situated within a plane. Because of this offset, there is no need for complicated undercuts on the component according to the invention. As a result, the component can be produced as an injection-molded plastic part.

Figure 7:
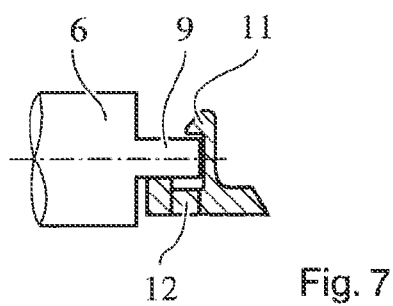

FIG. 7 shows a further possibility for the latching connection of the rolling body in the component. In the present case, the bearing pin 9 is here fastened to the component by means of a latching means 11, here a clip. This clip has a lug that fastens the rolling body to the component. This component has a recess 12 beneath the latching lug by virtue of which an element can be removed from the mold, which is required in order to create the undercut of the latching lug.

The invention claimed is:

1. A linear guide comprising:
a first trapezoidal component having a base element and two arms, wherein each of the two arms of the first trapezoidal component is connected to the base element in a respective transition region;
at least one sliding element, wherein the at least one sliding element is positioned on at least one of the base element and the two arms of the first trapezoidal component; and
a second trapezoidal component, wherein the first trapezoidal component and the second trapezodial component are slidable lengthwise relative to one another, the first trapezoidal component at least partially surrounds the second trapezoidal component, the at least one sliding element comprises a biasing member configured to apply a biasing force on an outer surface of the second trapezoidal component, the at least one sliding element is disposed in a gap between the first trapezoidal component and the second trapezoidal component, the at least one sliding element comprises a frame with latching tongues configured to positively engage corresponding recesses in the first trapezoidal component to fixedly secure the at least one sliding component to the first trapezoidal component, the biasing member comprises a plurality of leaf springs integrally formed with the frame, the plurality of leaf springs form a surface of the at least one sliding element that faces the outer surface of the second trapezoidal component and that bears against the second trapezoidal component, one of the first trapezoidal component and the second trapezoidal component is coupled to a headrest surface, the other of the first trapezoidal componentand the second trapezoidal component is coupled to a rear shell of a vehicle seat.

2. A vehicle interior design part having the linear guide as claimed in claim 1.

3. The vehicle interior design part as claimed in claim 2, comprising a head restraint in which the headrest surface can be adjusted relative to the rear shell of the vehicle seat.

4. The linear guide as claimed in claim 1, wherein the at least one sliding element comprises a plurality of sliding elements, and at least one sliding element of the plurality of sliding elements is positioned on the base element and at least one sliding element of the plurality of sliding elements is positioned on each of the two arms of the first trapezoidal component.

5. The linear guide as claimed in claim 1, wherein each transition region has a smaller material thickness than one or more of the base element and the two arms.

* * * * *